United States Patent
Smith

(10) Patent No.: US 6,792,515 B2
(45) Date of Patent: Sep. 14, 2004

(54) SYSTEM FOR ADDRESSING PROCESSORS CONNECTED TO A PERIPHERAL BUS

(75) Inventor: Bruce Alan Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 09/886,190

(22) Filed: Jun. 21, 2001

(65) Prior Publication Data

US 2002/0198608 A1 Dec. 26, 2002

(51) Int. Cl.[7] .............................................. G06F 12/00
(52) U.S. Cl. ..................................... 711/153; 710/311
(58) Field of Search .......................... 711/148–149, 153, 711/158, 170–173; 710/104, 305–306, 309, 311–317

(56) References Cited

U.S. PATENT DOCUMENTS 6,240,480 B1 * 5/2001 Wong et al. ................ 710/311
6,308,234 B1 * 10/2001 Davies et al. ............... 710/104
6,449,705 B1 * 9/2002 Peloquin et al. ............ 711/173
6,480,941 B1 * 11/2002 Franke et al. ............... 711/153
6,625,673 B1 * 9/2003 Dickey et al. ................ 710/52
6,647,472 B2 * 11/2003 Atkinson et al. ........... 711/158

* cited by examiner

Primary Examiner—Nasser Moazzami
(74) Attorney, Agent, or Firm—Joseph P. Lally; Casimer K. Salys

(57) ABSTRACT

A combination of data processing systems that are connected to a common peripheral bus, such as a PCI bus. The processor(s) of each system or blade may communicate with the peripheral bus through an intermediate bus controller. The bus controller may include facilities, such as registers that define a starting address, suitable for defining a window in the blade's system memory that is available or visible to other processors (or masters) on the bus. One or more of the bus controllers may be configured to read information that uniquely identifies each system or blade. The bus controller may use this identification information to define the window in the blade's system memory that is visible to other processors. In an embodiment where each blade is connected to a PCI bus through a CompactPCI® connector, the identification information may be read from the geographic address (GA) pins on the system's J2 connector.

18 Claims, 4 Drawing Sheets

SYSTEM FOR ADDRESSING PROCESSORS CONNECTED TO A PERIPHERAL BUS

BACKGROUND

1. Field of the Present Invention

The present invention generally relates to the field of data processing systems and more particularly to a system and method for addressing processor-based systems that are connected to a common peripheral bus.

2. History of Related Art

In the field of data processing systems, the use of standardized peripheral or IO busses is well known. Among the more prevalent of such busses is the Peripheral Components Interface (PCI) bus as specified in the *PCI Local Bus Specification Rev.* 2.2 available from the PCI Special Interest Group 5440 SW Westgate Drive, Suite 217, Portland, Oreg. 97221. All devices connected to a PCI bus are mapped into a common, shared address space. Any bus master or transaction initiator can access any target device simply by reading or writing the target's portion of the shared address space. PCI transactions are said to be anonymous because target devices are unable to determine the initiator of a transaction. The shared, anonymous characteristics of PCI are generally desirable attributes for conventional PCI environments in which a CPU or set of CPUs is one of the bus agents and the computer system peripherals are the other bus agents.

Referring to FIG. 3, a data processing system 300 typical of the prior art is depicted. Data processing system 300 includes one or more processors 302 that are each connected to a system bus 303. Processors 302 can access a system memory 304 via the system bus 303. In addition, a bus controller/bus arbiter 306 is connected between the system bus 303 and a peripheral bus 307. For purposes of this discussion, the peripheral bus 307 is typically compliant with Rev. 2.2 of the PCI Local Bus specification. One or more peripheral device(s) or adapter(s) 308 are connected to the peripheral bus 307. Peripheral devices 308 may include any number of devices including, as examples, hard disk adapters, graphics adapters, audio adapters, and high-speed network adapters. The address space of bus 307 is divided among peripheral devices 308. Typically, each peripheral device 308 tied to peripheral bus 307 is able to "see" every transaction that occurs on the bus. More specifically, all devices 308 on bus 307 receive the same data, address, and control signals. Thus, bus 307 is referred to as a shared bus. In addition, transactions on bus 307 are anonymous because the data, address, and control signals of bus 307 typically do not include information indicating the device that originated the transaction.

While a common, shared address space may be suitable for traditional microprocessor-based designs, it may be undesirable in a PCI-based multiprocessor environment. For purposes of this disclosure, a PCI-based multiprocessing system refers to a computer system in which multiple CPU-based systems are connected to a single PCI bus, typically through a backplane connection. In this environment, it may be desirable to isolate selected processors from others and to enable "private conversations" between processors or between one or more processors and selected peripherals. The shared address space and anonymous transactions of the currently implemented PCI make it difficult for each processor to communicate to its counterparts on the bus. It would, therefore, be highly desirable to implement a system and method for enabling processors on a common PCI bus to communicate with each other. It would be further desirable if the implemented system did not require modification of existing PCI compliant devices and did not require alteration or amendment of the PCI specification itself. It would be still further desirable if the implemented solution did not require complex or extensive modifications to existing hardware.

SUMMARY OF THE INVENTION

The problems identified above are in large part addressed by a system and method in which two or more processors are connected together on a common peripheral bus such as a PCI bus. Each of the processors may communicate with the peripheral bus through an intermediate bus controller. The bus controller may include facilities, such as a register that defines a starting address, suitable for defining a window in its corresponding system memory that is available or visible to other processors (or masters) on the PCI bus. These facilities for defining the visible window in memory space may include existing facilities designed for defining a graphics memory window in system memory, such as facilities found in processors implementing the Accelerated Graphics Port (AGP) protocol.

One or more of the bus controllers may be configured to read information that uniquely identifies each system or blade. The bus controller may use this identification information to define the window in the blade's system memory that is visible or available to other processors or bus masters. In an embodiment where each blade is connected to a PCI bus through a CompactPCI® connector, for example, the identification information may be read from the geographic address (GA) pins on the system's J2 connector, where each blade's GA pins are hardwired to a unique combination of 0's (ground) and 1's Vcc at the connector.

In one embodiment, the system may include a system server blade that determines the number of server blades connected to the bus and the identification information associated with each connected blade. The system server blade may provide this information to each connected blade on the bus such that each system is aware of the other systems connected to the bus. Alternatively, each processor can scan the bus testing predetermined memory address ranges to identify other bus participants.

By using information that is unique to each blade on the bus to define the memory window that is accessible to each system, the invention enables the use of unique memory spaces on each processor target without introducing address mapping hardware that might otherwise be required.

BRIEF DESCRIPTION OF THE DRAWINGS

Other objects and advantages of the invention will become apparent upon reading the following detailed description and upon reference to the accompanying drawings in which.

Figure 1:
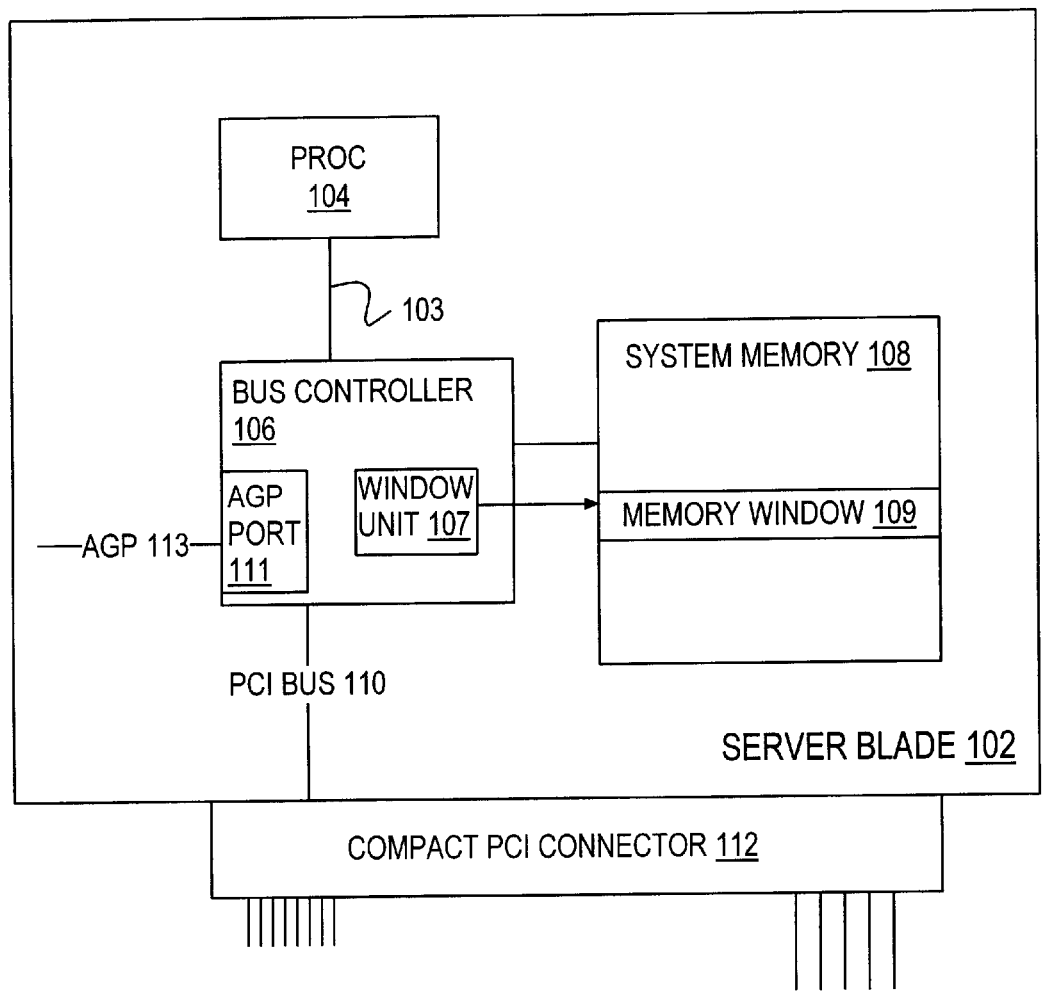
FIG. 1 is a block diagram of a server blade suitable for use in one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram illustrating selected features of a data processing system suitable for use in one embodiment of the present invention and identified in FIG. 1 as server blade 102. A server blade refers to a printed circuit board, typically sized according to some industry standard size, on which one or more processors, memory, and a processor chip set are attached. In one embodiment, multiple server blades 102 are installed in a chassis to form a multi-processor combination. The chassis may include backplane connectors through which each blade is connected to a peripheral bus, such as a PCI bus. The physical dimensions of each server blade printed circuit board may comply with a bus standard such as the CompactPCI® specification (Rev. 2.1 or later) adapted by the PCI Industrial Computers Manufacturers Group (PICMG) and incorporated by reference herein.

In the depicted embodiment, server blade 102 includes one or more processor(s) 104 connected to a system memory 108 through an intermediate bus bridge/memory controller 106 (referred to herein as bus controller 106). Processor 104 may be implemented with any of a variety of commercially distributed general purpose microprocessors including PowerPC® processors from IBM Corporation and Pentium® processors from Intel Corporation or another x86 compatible processor. System memory 108 is characterized by the size of its physical memory. This memory is typically implemented with a volatile storage medium such as Dynamic Random Access Memory (DRAM). Although bus controller 106 is depicted as a single device, it will be appreciated that the memory controller and bus bridge functions may be implemented on two or more devices such as the Intel® 815EP chip set family. Alternatively, portions of the bus bridge functions may be integrated into processor 104 itself.

Bus controller 106 typically includes facilities, referred to herein as window defining unit 107, that define a memory window 109 in system memory 108. Window defining unit 107 may include, for example, a first register defining the starting or base address of memory window 109 and a second register defining the size of memory window 109. Cycles that access memory within memory window 109 may be treated differently from cycles that access other portions of system memory 108. A processor cycle, for example, that accesses portions of system memory 108 outside of memory window 109, may be trapped internally such that the cycle is not forwarded to the peripheral bus represented in FIG. 1 by PCI bus 110. Processor cycles that access an address within memory window 109, on the other hand, may be forwarded to or broadcast over PCI bus 110. In addition, other systems or bus masters that are attached to PCI bus 110 (via an appropriate PCI connector) may have access to portions of system memory 108 within memory window 109 whereas the remaining portions of system memory 108 may be unavailable to PCI bus masters. Thus, memory window 109 represents a portion of system memory 108 that is visible to the peripheral bus.

Processor 104 and bus controller 106 may implement Accelerated Graphics Port (AGP) technology designed to improve graphics performance of microprocessor-based data processing systems. In this embodiment, bus controller 106 may include an AGP interface 111 that provides an AGP port to which AGP bus 113 is connected. AGP bus 113 is a dedicated, high-speed bus between system memory 108 and a graphics adapter and display device not depicted in FIG. 1. AGP facilitates the transfer of large blocks of memory from system memory 108 to the graphics chip by providing dedicated hardware that performs the necessary address translation functions. These hardware facilities include facilities for defining a window in system memory that is reserved for graphics memory. A processor or PCI master transaction accessing the defined graphics memory is address translated by the bus controller to the PCI bus. One embodiment of the invention contemplates leveraging the existing AGP facilities in some bus controllers as window unit 107 to enable bus-wide access to portions of system memory in a PCI-based, multiprocessor combination.

Providing facilities to make portions of each server blade's system memory visible to PCI bus masters raises the question of how to address each blade's visible memory uniquely. While it is desirable to be able to uniquely address the visible system memory of each blade, it is undesirable to introduce address mapping hardware to achieve this result because of the increased cost and complexity associated with such a solution. One embodiment of the invention takes advantage of geographic addressing facilities to provide a method of differentiating between the memory windows 109 of the various server blades 102.

Figure 2:
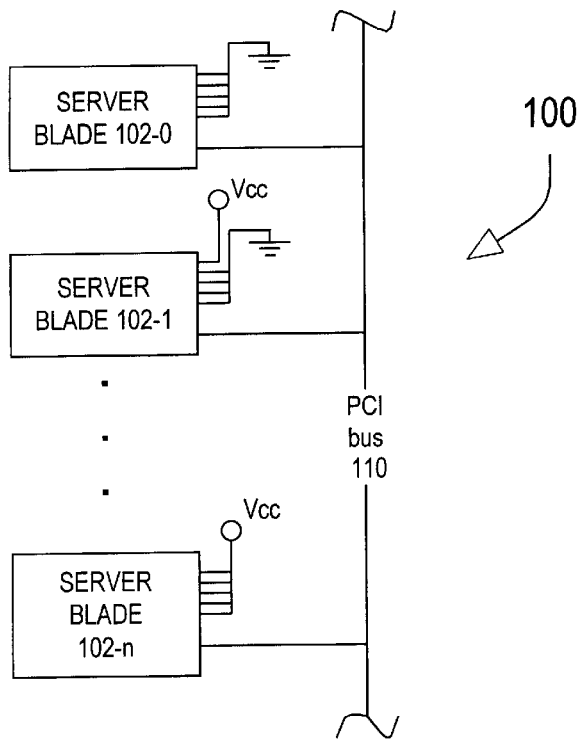
FIG. 2 is a block diagram of a data processing system according to one embodiment of the invention.
Figure 3:
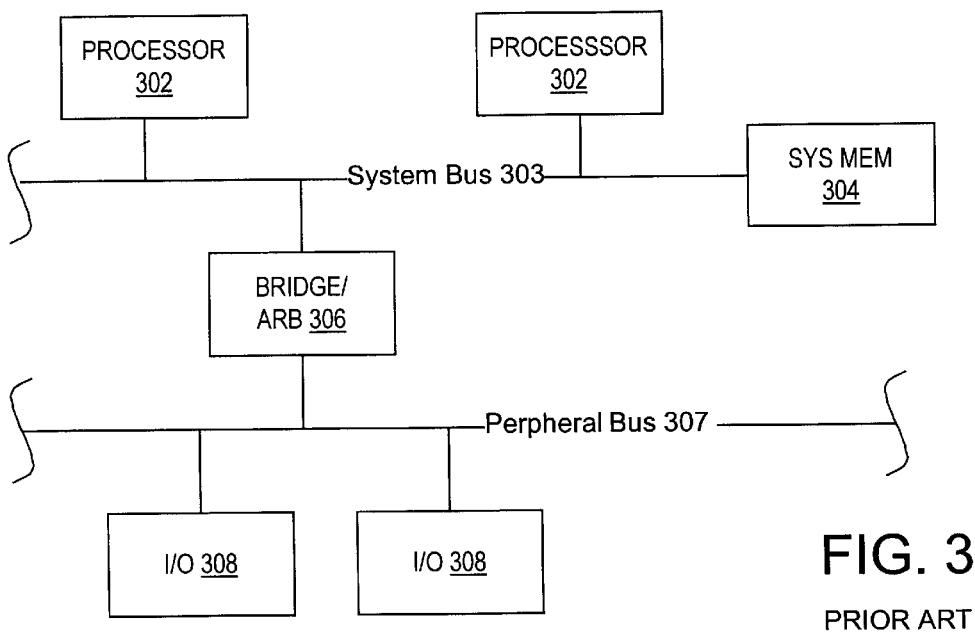
FIG. 3 is an illustration of a data processing system according to the prior art.

Referring now to FIG. 2, selected features of a PCI-based, multiprocessor combination 100 suitable for use in one embodiment of the present invention are depicted. In the depicted embodiment, combination 100 includes two or more server blades 102-0, 102-1, through 102-n (generically or collectively referred to as server blade(s) 102), where each server blade 102 is connected to a PCI bus 110. Although PCI bus 110 is depicted as a single bus segment, it will be appreciated that, dependent upon the number of attached server blades 102, PCI bus 110 may require multiple segments and/or intervening PCI-to-PCI bus bridges.

Each server blade 102 may be installed in a corresponding slot of a system cage. In one embodiment, each server blade 102 complies with the physical specification set forth in the CompactPCI® specification. In this embodiment, each blade 102 connects to the PCI bus 110 through a CompactPCI® connector 112. The CompactPCI® specification provides for geographic addressing of connected devices. More specifically, the CompactPCI® specification defines five geographic address pins in the J2 (or P2) connector. Each of these pins, identified as GA0–GA4, is physically tied to either a logical low voltage (ground) or a logical high voltage (Vcc) at connector 112. The geographic address of any particular connector 112 is determined by the binary number defined by the GA pins. If the GA pins of each connector 112 in combination 100 are configured uniquely, each server blade 102 will have a unique 5-bit geographic address on bus 110. Thus, as many as 32 blades 102, each having a unique geographic address, may be connected to bus 110. Although the GA pins are non-bussed pins, the bus controller 106 of each blade 102 is able to read the value of its corresponding GA pins thereby enabling transfer of the geographic address information over bus 110.

Figure 5:
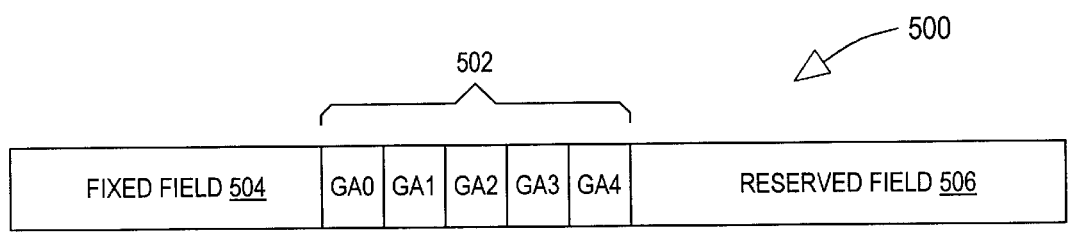
FIG. 5 diagrams an embodiment of a register defining the start of a system memory window according to one embodiment of the invention.

The invention may make use of the geographic address information provided by the CompactPCI connectors 112 to determine unique addresses for the system memory windows 109 in each server blade 102 such that each memory window 109 in combination 100 may be individually accessed. As described previously, window unit 107 of bus controller 106 may include a register (or multiple registers) defining a starting address for its corresponding memory window 109. In one embodiment, window unit 107 uses its geographic address to determine the portion of its system memory 108 that is visible to PCI bus 110. More specifically, one embodiment of window unit 107 may incorporate the geographic address into the starting address of window memory 109. Referring to FIG 5, an example of the manner in which window unit 107 may use the geographic address information to determine the memory window 109 is depicted. In the depicted embodiment, window unit 107 includes a memory window register 500 that indicates the starting address for the corresponding memory window 109 in system memory 108. Memory window register 500 includes a geographic address field 502 that indicates, as its name implies, the geographic address on bus 110 of sewer blade 102. Memory window register 500 may further include a fixed field 504 that defines a portion of the memory window starting address that is common to each server blade 102 and a reserved field 506 that is preferably defined to be all 0's in order to align the memory window 109 at some desired alignment location. In one embodiment, for example, in which it is desired to align memory windows 109 on megabyte boundaries, the reserved field 506 may include bits 0 through 19. In this example, assuming a 32 bit addressing scheme, the fixed field 504 would include seven bits. The seven bits in fixed field 502 would define a 32 MB portion of each system memory 108 in which the corresponding memory windows would be found, In this example, a 1 MB memory window could be defined for each of the 32 possible server blades with no overlapping of memory window addresses.

Figure 6:
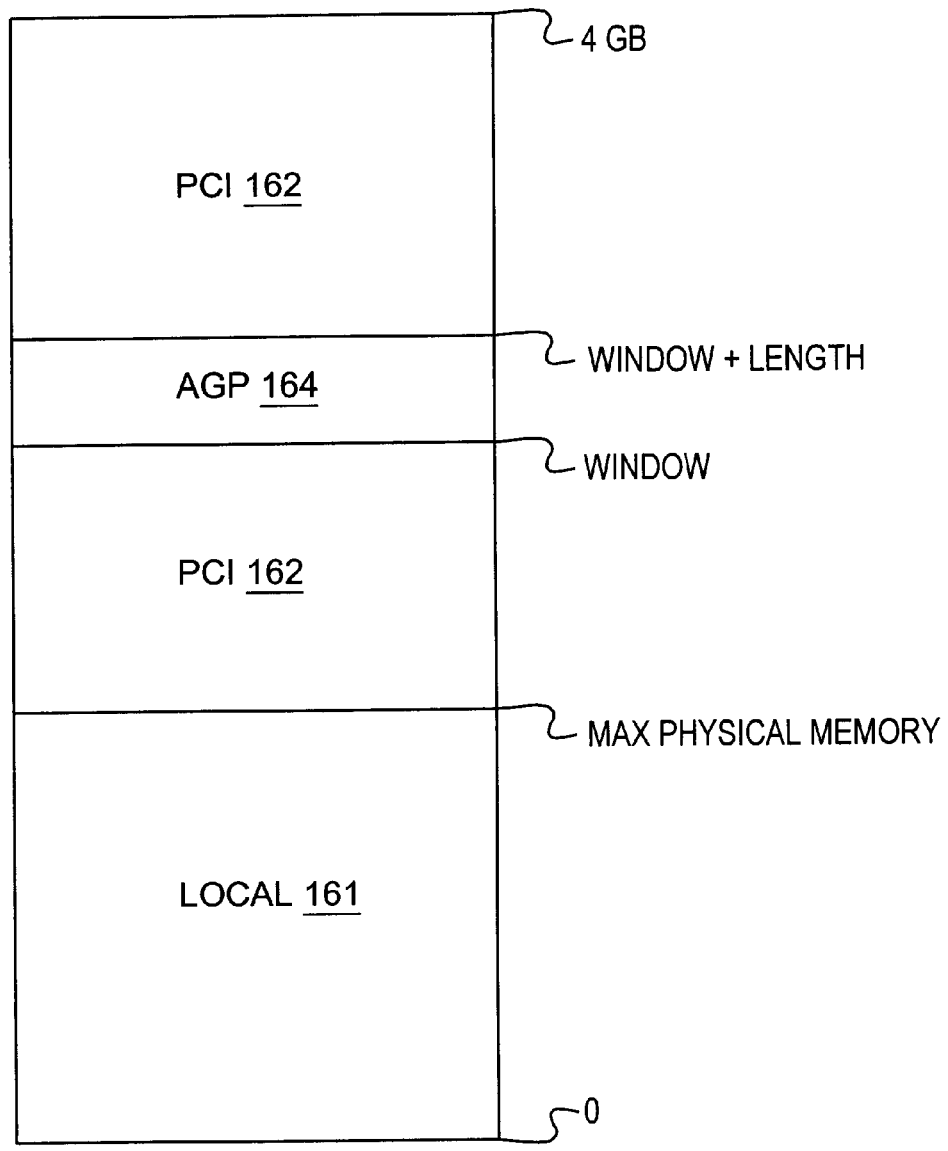
FIG. 6 is a conceptual representation of the memory space in a data processing system suitable for use in the present invention.

In an embodiment of the invention in which the processors 104 include AGP hardware such as the graphics address remapping table (GART) described in *Accelerated Graphics Port Technology,* (Intel 2001), (see http://developer.intel.com/technology/agp), the invention includes the ability to define the bus-visible memory windows in address space above the maximum physical memory address. Referring to FIG. 6, a conceptual representation of the addressable space 160 of a server blade 102 that includes an AGP compatible processor is presented. In the depicted embodiment, addresses in the range of 0 to the physical memory maximum address are treated as local accesses by the bus controller. The AGP memory space 164 that is defined by the AGP hardware in each processor may be located, as illustrated, is a window or hole in the PCI space 162 above the local space 161. This AGP space 164 may serve as memory window 109 depicted in FIG. 1. Using the AGP hardware to achieve the PCI-visible address window is acceptable in the dense server environment exemplified by the combination 100 depicted in FIG. 2, because the server blades 102 are typically not supporting graphics hardware. Moreover, by locating the memory window 109 above local space 161, this implementation of the invention greatly simplifies memory allocation issues that would result if the memory window 109 was located within local space 161.

In the described manner, each memory window 109 is uniquely addressable from its counterpart server blades 102 on bus 110. To address the memory window for the server blade with geographic address 5, for example, a bus master would assert an address in which the high order bits are equal to the value of fixed field 504, the next five bits are equal to the 5 (the geographic address of the targeted window) and the low order bits would be used for addressing within the corresponding memory 109. The memory windows 109 of each server blade 102 may be used to store information that is valuable to other blades 102 of combination 100. This information may include, for example, management data, current blade status, tasks in process on the blade, and so forth.

Figure 4:
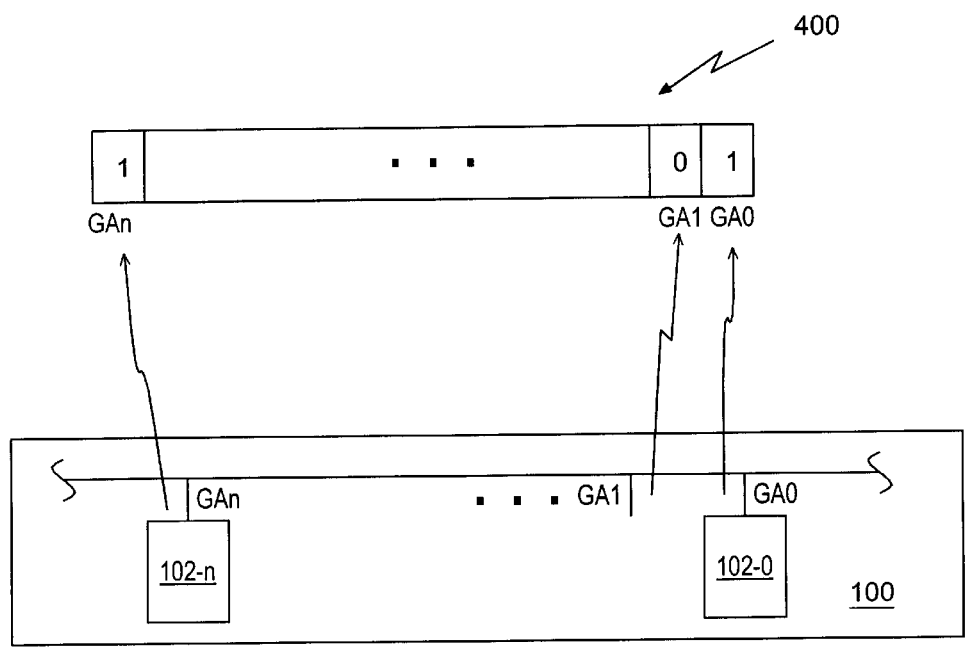
FIG. 4 is a conceptual representation of configuration information suitable for use in the present invention.

In one embodiment of the invention, the set of server blades 102 includes a system server blade 102-0 that is responsible for managing the configuration of the remaining blades. System server blade 102-0 may determine the geographic addresses of server blades 102 that are connected to bus 110 and provide this information to each of the remaining server blades 102. Referring to FIG. 4, system server 102-0 may include configuration information 400 (implemented as either a dedicated register or a defined location in the system memory of system server 102-0) that indicates the geographic addresses of blades that are attached to bus 110. Each bit in the configuration information may refer to a corresponding geographic location such that bit 0 of configuration information 400 indicates whether a server blade 102 is attached to geographic address 0 of bus 110, bit 1 indicates whether a server blade 102 is attached to geographic address 1, and so forth. After system server blade 102-0 has determined which geographic addresses are occupied, it can set configuration information appropriately and send the configuration information to each of attached server blade 102. In another embodiment, each server blade may read the configuration information from system server blade 102-0. Alternatively, each server blade may determine which geographic addresses are occupied by bus participants by performing write/read sequences to specific address ranges corresponding to each of the possible geographic addresses. If the write/read sequence (such as writing a "0," reading a "0," writing a "1," and reading a "1") is completed successfully, a bus participant is assumed to reside at the corresponding geographic address.

It will be apparent to those skilled in the art having the benefit of this disclosure that the present invention contemplates a system and method for enabling processors connected via a common IO bus to communicate with each other without incorporating any significant memory mapping hardware into the system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   a processor connected to a host bus;
   a system memory accessible to the processor;
   a bus controller connected between the host bus and a peripheral bus, the bus controller including a window unit enabled to define a window in the system memory that is accessible to a peripheral bus master wherein the memory space of the defined window is determined at least in part by a geographic address of the data processing systems;
   wherein the geographic address of the system is defined by the state of a set of geographic address pins of a connector that connects the system to the peripheral bus.

2. The system of claim 1, wherein the window unit includes a first register configured to define a starting address of the window.

3. The system of claim 2, wherein the geographic address of the system provides a portion of a value stored in the first register.

4. The system of claim 1, wherein the memory space of the defined window is located above the maximum physical address of the system memory.

5. The system of claim 1, wherein the peripheral bus is a PCI bus and the connector is a CompactPCI compliant connector.

6. The system of claim 1, wherein the bus controller includes an accelerated graphics port (AGP) interface.

7. The system of claim 6, wherein the bus controller is configurable to enable a graphics controller connected to the bus controller via the AGP interface to access a portion of the system memory defined by the window unit.

8. A combination of data processing systems, comprising:
   a set of data processing systems, each connected to a common peripheral bus and each including:
      a processor connected to a host bus,
      a system memory accessible to the processor, and
      a bus controller connected between the host bus and a peripheral bus, each bus controller including a window unit enabled to define a window in the corresponding system memory that is accessible to a master of the peripheral bus and wherein the memory space of the defined window is determined at least in part by a geographic address of the data processing system;
   wherein the geographical address of each data processing system is uniquely defined by the state of a set of geographic address pins of a corresponding peripheral bus connector such that each of the memory windows has a unique address space.

9. The combination of claim 8, wherein the window unit includes a first register configured to define a starting address of the window.

10. The combination of claim 9, wherein the geographic address of the system provides a portion of a value stored in the first register.

11. The combination of claim 8, wherein the memory space of the defined window is located above the maximum physical address of the system memory.

12. The combination of claim 8, wherein the peripheral bus is a PCI bus and the connector is a CompactPCI compliant connector.

13. The combination of claim 8, wherein the bus controller includes an accelerated graphics port (AGP) interface.

14. The combination of claim 13, wherein the bus controller is configurable to enable a graphics controller connected to the bus controller via the AGP interface to access a portion of the system memory defined by the window unit.

15. A data processing system, comprising:
   a processor including accelerated graphics port (AGP) facilities for defining a system memory window, wherein the location of the system memory window within a system memory space is determined at least in part by a geographical address unique to the data processing system;
   a system memory accessible to the processor, wherein the system memory is characterized by a physical memory maximum address;
   a controller connected to the processor via a host bus and connected to the system memory via a memory bus, wherein the controller provides a peripheral bus interface suitable for connecting the system to a shared peripheral bus and wherein the bus controller uses the system memory window defined by the AGP facilities as a window in the system memory space that is uniquely addressable from a master of the shared peripheral bus.

16. The system of claim 15, wherein the window defining means are enabled to define the addressable window in the system's memory space above the physical memory maximum address.

17. The system of claim 15, wherein the windowing means includes a register configured to define a staffing address of the addressable window, and wherein at least a portion of the register includes the geographical address of the processor.

18. The system of claim 15, wherein the data processing system further includes a CompactPCI connector suitable for connecting the data processing system to shared the peripheral bus and further wherein the geographical address of the data processing system is determined by the state of a set of geographical address pins on the connector.

* * * * *

UNITED STATES PATENT AND TRADEMARK OFFICE
CERTIFICATE OF CORRECTION

PATENT NO. : 6,792,515 B2  Page 1 of 1
DATED : September 14, 2004
INVENTOR(S) : Bruce Alan Smith It is certified that error appears in the above-identified patent and that said Letters Patent is hereby corrected as shown below:

Column 6,
Lines 54-67, claim 1 should read as follows:
A data processing system, comprising:

a processor connected to a host bus;

a system memory accessible to the processor;

a bus controller connected between the host bus and a peripheral bus, the bus controller including a window unit enabled to define a window in the system memory that is accessible to a peripheral bus master wherein the memory space of the defined window is determined at least in part by a geographic address of the data processing system;

wherein the geographic address of the system is defined by the state of a set of geographic address pins of a connector that connects the system to the peripheral bus.

Column 8,
Lines 33-37, claim 17 should read as follows:
The system of claim 15, wherein the windowing means includes a register configured to define a starting address of the addressable window, and wherein at least a portion of the register includes the geographical address of the processor.

Signed and Sealed this

Twenty-sixth Day of April, 2005

JON W. DUDAS
*Director of the United States Patent and Trademark Office*